United States Patent
Dave et al.

(10) Patent No.: US 11,849,726 B2
(45) Date of Patent: Dec. 26, 2023

(54) MICROBICIDAL COMPOSITION

(71) Applicant: Lanxess Corporation, Pittsburgh, PA (US)

(72) Inventors: Hiteshkumar Dave, Collegeville, PA (US); Kiran Pareek, Collegeville, PA (US); Eileen Warwick, Collegeville, PA (US)

(73) Assignee: Lanxess Corporation, Pittsburg (PA)

( * ) Notice: Subject to any disclaimer, the term of this patent is extended or adjusted under 35 U.S.C. 154(b) by 21 days.

(21) Appl. No.: 16/324,168

(22) PCT Filed: Sep. 25, 2017

(86) PCT No.: PCT/US2017/053203
§ 371 (c)(1),
(2) Date: Feb. 8, 2019

(87) PCT Pub. No.: WO2018/063971
PCT Pub. Date: Apr. 5, 2018

(65) Prior Publication Data
US 2020/0205405 A1    Jul. 2, 2020

Related U.S. Application Data

(60) Provisional application No. 62/402,769, filed on Sep. 30, 2016.

(51) Int. Cl.
*A01N 31/14*    (2006.01)

(52) U.S. Cl.
CPC .................................... *A01N 31/14* (2013.01)

(58) Field of Classification Search
CPC ........................................................ A61N 31/14
See application file for complete search history.

(56) References Cited

U.S. PATENT DOCUMENTS

| | | | |
|---|---|---|---|
| 5,147,884 A | 9/1992 | Diehl et al. | |
| 9,469,721 B2 * | 10/2016 | Turakhia | |
| 2004/0152748 A1 | 8/2004 | Diehl et al. | |
| 2007/0007811 A1 | 1/2007 | Chung | |
| 2011/0318494 A1 * | 12/2011 | Donate | |
| 2012/0009176 A1 | 1/2012 | Ji et al. | |
| 2013/0136709 A1 | 5/2013 | Pillai et al. | |
| 2013/0231397 A1 | 9/2013 | Beilfuss et al. | |
| 2013/0277279 A1 | 10/2013 | Marques et al. | |
| 2016/0219875 A1 | 8/2016 | Gandhi et al. | |

OTHER PUBLICATIONS

Lucchini, et al., "Antibacterial activity of phenolic compounds and aromatic alcohols", Res. in Microbiol., vol. 141, No. 4, pp. 499-510 (1990).

* cited by examiner

*Primary Examiner* — Alma Pipic
(74) *Attorney, Agent, or Firm* — Howson & Howson, LLP; Colleen M. Schaller

(57) ABSTRACT

The invention is directed to a synergistic microbicidal composition having two components: phenoxyethanol and dipropylene glycol phenyl ether and a method for inhibiting growth of microbes using the same.

2 Claims, No Drawings

MICROBICIDAL COMPOSITION

This invention relates to microbicidal compositions containing 2-phenoxyethanol and dipropylene glycol phenyl ether.

A composition containing 5-chloro-2-methylisothiazolin-3-one, 2-methylisothiazolin-3-one and a nonionic dispersant is disclosed in U.S. Pat. No. 4,295,932. The composition contains a 3:1 mixture of 5-chloro-2-methylisothiazolin-3-one and 2-methylisothiazolin-3-one, and a copolymer of ethylene oxide and propylene oxide which appears to have the same composition as PLURONIC L61 or TERGITOL L61 dispersant. However, there is a need for combinations of microbicides having synergistic activity against various strains of microorganisms to provide effective control of the microorganisms. Moreover, there is a need for such combinations containing lower levels of individual microbicides for environmental and economic benefit. The problem addressed by this invention is to provide such synergistic combinations of microbicides.

STATEMENT OF THE INVENTION

The present invention is directed to a synergistic microbicidal composition comprising phenoxyethanol and dipropylene glycol phenyl ether.

The present invention is further directed to a method for inhibiting the growth of microorganisms in an aqueous medium; said method comprising adding to the aqueous medium phenoxyethanol and dipropylene glycol phenyl ether wherein the weight ratio of phenoxyethanol to dipropylene glycol phenyl ether is from 1:0.01 to 1:27.

DETAILED DESCRIPTION OF THE INVENTION

"Phenoxyethanol" is 2-phenoxy-1-ethanol (CAS No. 122-99-6). Dipropylene glycol phenyl ether is the compound with CAS No. 51730-94-0. As used herein, the following terms have the designated definitions, unless the context clearly indicates otherwise. The term "microbicide" refers to a compound capable of inhibiting the growth of or controlling the growth of microorganisms; microbicides include bactericides, fungicides and algaecides. The term "microorganism" includes, for example, fungi (such as yeast and mold), bacteria and algae. The following abbreviations are used throughout the specification: ppm=parts per million by weight (weight/weight), mL=milliliter. Unless otherwise specified, temperatures are in degrees centigrade (° C.), references to percentages are percentages by weight (wt %) and amounts and ratios are on an active ingredient basis.

In the present invention a synergistic antimicrobial composition is formed by combining phenoxyethanol and dipropylene glycol phenyl ether. Synergy between phenoxyethanol and dipropylene glycol phenyl ether is demonstrated over the range of 1:0.01 and 1:27.

Preferably, each of the synergistic microbicidal compositions is substantially free of microbicides other than to dipropylene glycol phenyl ether and phenoxyethanol, i.e., it has less than 1 wt % of microbicides other than to dipropylene glycol phenyl ether and phenoxyethanol based on total weight of active ingredients, preferably less than 0.5 wt %, preferably less than 0.2 wt %, preferably less than 0.1 wt %. Preferably, when the dipropylene glycol phenyl ether and phenoxyethanol are added to an aqueous medium, the medium is substantially free of other microbicides, i.e., it has less than 1 wt % of microbicides other than the dipropylene glycol phenyl ether and phenoxyethanol based on total weight of active ingredients, preferably less than 0.5 wt %, preferably less than 0.2 wt %, preferably less than 0.1 wt %.

The compositions of this invention may contain other ingredients, e.g., defoamers and emulsifiers. The microbicidal compositions of the present invention can be used to inhibit the growth of microorganisms or higher forms of aquatic life (such as protozoans, invertebrates, bryozoans, dinoflagellates, crustaceans, mollusks, etc) by introducing a microbicidally effective amount of the compositions into an aqueous medium subject to microbial attack. Suitable aqueous media are found in, for example: industrial process water; electrocoat deposition systems; cooling towers; air washers; gas scrubbers; mineral slurries; wastewater treatment; ornamental fountains; reverse osmosis filtration; ultrafiltration; ballast water; evaporative condensers; heat exchangers; pulp and paper processing fluids and additives; starch; plastics; emulsions; dispersions; paints; latices; coatings, such as varnishes; construction products, such as mastics, caulks, and sealants; construction adhesives, such as ceramic adhesives, carpet backing adhesives, and laminating adhesives; industrial or consumer adhesives; photographic chemicals; printing fluids; household products, such as bathroom and kitchen cleaners; cosmetics; toiletries; shampoos; soaps; personal care products such as wipes, lotions, sunscreen, conditioners, creams, and other leave-on applications; detergents; industrial cleaners; floor polishes; laundry rinse water; metalworking fluids; conveyor lubricants; hydraulic fluids; leather and leather products; textiles; textile products; wood and wood products, such as plywood, chipboard, flakeboard, laminated beams, oriented strandboard, hardboard, and particleboard; petroleum processing fluids; fuel; oilfield fluids, such as injection water, fracture fluids, and drilling muds; agriculture adjuvant preservation; surfactant preservation; medical devices; diagnostic reagent preservation; food preservation, such as plastic or paper food wrap; food, beverage, and industrial process pasteurizers; toilet bowls; recreational water; pools; and spas.

The specific amount of the microbicidal compositions of this invention necessary to inhibit or control the growth of microorganisms in an application will vary. Typically, the amount of the composition of the present invention is sufficient to control the growth of microorganisms if it provides from 1,000 to 30,000 ppm (parts per million) active ingredients of the composition. It is preferred that the active ingredients (i.e., dipropylene glycol phenyl ether and phenoxyethanol) of the composition be present in the medium to be treated in an amount of at least 2,000 ppm, preferably at least 3,000 ppm, preferably at least 4,000 ppm. It is preferred that the active ingredients of the composition be present in the locus in an amount of no more than 16,000 ppm, preferably no more than 14,000 ppm, preferably no more than 12,000 ppm, preferably no more than 10,000 ppm, preferably no more than 8,000 ppm, preferably no more than 7,000 ppm. In a method of this invention, a composition is treated to inhibit microbial growth by adding, together or separately, the nonionic surfactant and phenoxyethanol, in amounts that would produce the concentrations indicated above.

Examples

Phenoxyethanol and Dipropylene glycol phenyl ether were evaluated for synergy by determining the synergy index (S.I.) of the combination. Synergy index was calculated based on minimum inhibitory concentrations (MIC) of two antimicrobial compounds (A and B) alone and in combinations. The MIC test were run in accordance with the method described in U.S. Pat. No. 9,034,905. The tests organisms were Gram negative bacteria (*Pseudomonas aeruginosa* ATCC #15442), Gram positive bacteria (*Staphylococcus aureus* ATCC #6538), and yeast (Candida albicans ATCC #10231) and mold (*Aspergillus brasiliensis* ATCC #16404). Contact time for the bacteria was 24 and 48 hours, yeast was 48 and 72 hrs, and 3 and 7 days for mold. The test was carried out in 96 well microtiter plates. More details on the tests are shown in Tables 1-4.

TABLE 1

| Products tested | |
| --- | --- |
| Solvent | Trade name |
| Phenoxyethanol | Neolone PH100 ™ Commercially available from The Dow Chemical Company, Midland, MI |
| Dipropylene glycol phenyl ether | Dowanol DiPPh ™ Commercially available from The Dow Chemical Company, Midland, MI |

TABLE 2

Inoculums Used
Inoculum Size of organisms (CFU/ml)

| Staphylococcus aureus ATCC# 6538 | Pseudomonas aeruginosa ATCC # 15442 | Aspergillus brasiliensis ATCC# 16404 | Candida albicans ATCC#10231 |
| --- | --- | --- | --- |
| 1.2E+06 | 1.2E+06 | 3.1E+04 | 4.7E+04 |

TABLE 3

Media Used
Media Used for testing

| Staphylococcus aureus ATCC# 6538 | Pseudomonas aeruginosa ATCC # 15442 | Aspergillus brasiliensis ATCC# 16404 | Candida albicans ATCC#10231 |
| --- | --- | --- | --- |
| 10% Tryptic soy broth | 10% Tryptic soy broth | Potato dextrose broth | Potato dextrose broth |

The test results for demonstration of synergy of the MIC combinations are shown in Table 4. Each Table shows the combinations of two components results against the microorganisms tested with incubation times; the end-point activity in ppm measured by the MIC for compound A alone (CA), for component B alone (CB), and the mixture (Ca) and (Cb); the calculated SI value; and the range of synergistic ratios for each combination tested. SI is calculated as follows:

Ca/CA+Cb/CB=Synergy Index ("SI")

Wherein:
CA=concentration of compound A in ppm, acting alone, which produced an end point (MIC of Compound A).
Ca=concentration of compound A in ppm, in the mixture, which produced an end point.
CB=concentration of compound B in ppm, acting alone, which produced an end point (MIC of Compound B).
Cb=concentration of compound B in ppm, in the mixture, which produced an end point.

When the sum of Ca/CA and Cb/CB is greater than one, antagonism is indicated.

When the sum is equal to one, additivity is indicated, and when less than one, synergism is demonstrated.

Only synergistic ratios or ratios which reduce the use level of either component are illustrated in the table 4.

TABLE 4

Ca: component in ppm AI of NeolonePH100 (Phenoxyethanol)
Cb: component in ppm AI of Dowanol DiPPh (Dipropylene glycol phenyl ether)
Ratio: Ca:Cb

| Test Organisms | Contact Time | Ca | Cb | S.I. | Ca:Cb |
| --- | --- | --- | --- | --- | --- |
| A. brasiliensis ATCC # 16404 | 3 days | 3000 | 0 | — | — |
| | | 0 | 10000 | — | — |
| | | 2500 | 20 | 0.84 | 1:0.01 |
| | | 2500 | 30 | 0.84 | 1:0.01 |
| | | 2500 | 40 | 0.84 | 1:0.02 |
| | | 2500 | 50 | 0.84 | 1:0.02 |
| | | 2500 | 60 | 0.84 | 1:0.02 |
| | | 2500 | 100 | 0.84 | 1:0.04 |
| | | 2500 | 200 | 0.85 | 1:0.08 |
| | | 2500 | 300 | 0.86 | 1:0.12 |
| | | 2500 | 400 | 0.87 | 1:0.16 |
| | | 2500 | 500 | 0.88 | 1:0.20 |
| | | 2500 | 600 | 0.89 | 1:0.24 |
| | | 2500 | 800 | 0.91 | 1:0.32 |
| | | 2500 | 1000 | 0.93 | 1:0.40 |
| | | 2500 | 2000 | 1.03 | 1:0.80 |
| | | 2000 | 80 | 0.67 | 1:0.04 |
| | | 2000 | 100 | 0.68 | 1:0.05 |
| | | 2000 | 200 | 0.69 | 1:0.10 |
| | | 2000 | 300 | 0.70 | 1:0.15 |
| | | 2000 | 400 | 0.71 | 1:0.20 |
| | | 2000 | 500 | 0.72 | 1:0.25 |
| | | 2000 | 600 | 0.73 | 1:0.30 |
| | | 2000 | 800 | 0.75 | 1:0.40 |
| | | 2000 | 1000 | 0.77 | 1:0.50 |
| | | 2000 | 2000 | 0.87 | 1:1.00 |
| | | 2000 | 3000 | 0.97 | 1:1.50 |
| | | 2000 | 4000 | 1.07 | 1:2.00 |
| | | 1000 | 1000 | 0.43 | 1:1.00 |
| | | 1000 | 2000 | 0.53 | 1:2.00 |
| | | 1000 | 3000 | 0.63 | 1:3.00 |
| | | 1000 | 4000 | 0.73 | 1:4.00 |
| | | 1000 | 5000 | 0.83 | 1:5.00 |
| | | 1000 | 6000 | 0.93 | 1:6.00 |
| | | 1000 | 8000 | 1.13 | 1:8.00 |
| | | 750 | 2000 | 0.45 | 1:2.67 |
| | | 750 | 3000 | 0.55 | 1:4.00 |
| | | 750 | 4000 | 0.65 | 1:5.33 |
| | | 750 | 5000 | 0.75 | 1:6.67 |
| | | 750 | 6000 | 0.85 | 1:8.00 |
| | | 750 | 8000 | 1.05 | 1:10.67 |
| | | 500 | 4000 | 0.57 | 1:8.00 |
| | | 500 | 5000 | 0.67 | 1:10.00 |
| | | 500 | 6000 | 0.77 | 1:12.00 |
| | | 500 | 8000 | 0.97 | 1:16.00 |
| | | 400 | 4000 | 0.53 | 1:10.00 |
| | | 400 | 5000 | 0.63 | 1:12.50 |
| | | 400 | 6000 | 0.73 | 1:15.00 |
| | | 400 | 8000 | 0.93 | 1:20.00 |
| | | 300 | 4000 | 0.50 | 1:13.33 |
| | | 300 | 5000 | 0.60 | 1:16.67 |
| | | 300 | 6000 | 0.70 | 1:20.00 |
| | | 300 | 8000 | 0.90 | 1:26.67 |
| C. albicans ATCC # 10231 | 24 hrs | 5000 | 0 | — | — |
| | | 0 | 19992 | — | — |
| | | 4000 | 300 | 0.82 | 1:0.08 |
| | | 4000 | 400 | 0.82 | 1:0.10 |
| | | 4000 | 600 | 0.83 | 1:0.15 |
| | | 4000 | 800 | 0.84 | 1:0.20 |
| | | 4000 | 1000 | 0.85 | 1:0.25 |
| | | 4000 | 2000 | 0.90 | 1:0.50 |
| | | 4000 | 3000 | 0.95 | 1:0.75 |
| | | 4000 | 4000 | 1.00 | 1:1.00 |

TABLE 4-continued

Ca: component in ppm AI of NeolonePH100 (Phenoxyethanol)
Cb: component in ppm AI of Dowanol DiPPh (Dipropylene glycol phenyl ether)
Ratio: Ca:Cb

| Test Organisms | Contact Time | Ca | Cb | S.I. | Ca:Cb |
|---|---|---|---|---|---|
| | | 3000 | 800 | 0.64 | 1:0.27 |
| | | 3000 | 1000 | 0.65 | 1:0.33 |
| | | 3000 | 2000 | 0.70 | 1:0.67 |
| | | 3000 | 3000 | 0.75 | 1:1.00 |
| | | 3000 | 4000 | 0.80 | 1:1.33 |
| | | 3000 | 6002 | 0.90 | 1:2.00 |
| | | 3000 | 8004 | 1.00 | 1:2.67 |
| | | 2500 | 500 | 0.53 | 1:0.20 |
| | | 2500 | 600 | 0.53 | 1:0.24 |
| | | 2500 | 800 | 0.54 | 1:0.32 |
| | | 2500 | 1000 | 0.55 | 1:0.40 |
| | | 2500 | 2000 | 0.60 | 1:0.80 |
| | | 2500 | 3000 | 0.65 | 1:1.20 |
| | | 2500 | 4000 | 0.70 | 1:1.60 |
| | | 2500 | 6000 | 0.80 | 1:2.40 |
| | | 2500 | 8000 | 0.90 | 1:3.20 |
| | | 2500 | 10000 | 1.00 | 1:4.00 |
| | | 2000 | 3000 | 0.55 | 1:1.50 |
| | | 2000 | 4000 | 0.60 | 1:2.00 |
| | | 2000 | 6000 | 0.70 | 1:3.00 |
| | | 2000 | 8000 | 0.80 | 1:4.00 |
| | | 2000 | 10000 | 0.90 | 1:5.00 |
| | | 1000 | 4000 | 0.40 | 1:4.00 |
| | | 1000 | 6000 | 0.50 | 1:6.00 |
| | | 1000 | 8000 | 0.60 | 1:8.00 |
| | | 1000 | 10000 | 0.70 | 1:10.00 |
| | | 750 | 4000 | 0.35 | 1:5.33 |
| | | 750 | 6000 | 0.45 | 1:8.00 |
| | | 750 | 8000 | 0.55 | 1:10.67 |
| | | 750 | 10000 | 0.65 | 1:13.33 |
| | | 500 | 4000 | 0.30 | 1:8.00 |
| | | 500 | 6000 | 0.40 | 1:12.00 |
| | | 500 | 8000 | 0.50 | 1:16.00 |
| | | 500 | 10000 | 0.60 | 1:20.00 |
| S. aureus ATCC#6538 | 24 hrs | 5000 | 0 | — | — |
| | | 0 | 19992 | — | — |
| | | 3000 | 3998 | 0.80 | 1:1.33 |
| | | 3000 | 4997 | 0.85 | 1:1.67 |
| | | 3000 | 6002 | 0.90 | 1:2.00 |
| | | 3000 | 8004 | 1.00 | 1:2.67 |
| | | 2500 | 3998 | 0.70 | 1:1.60 |
| | | 2500 | 4997 | 0.75 | 1:2.00 |
| | | 2500 | 6002 | 0.80 | 1:2.40 |
| | | 2500 | 8004 | 0.90 | 1:3.20 |
| | | 2500 | 9999 | 1.00 | 1:4.00 |

The invention claimed is:

1. A synergistic microbicidal composition comprising phenoxyethanol and dipropylene glycol phenyl ether.

2. The synergistic microbicidal composition of claim 1, wherein the weight ratio of phenoxyethanol to dipropylene glycol phenyl ether is from 1:0.01 to 1:27.

* * * * *